United States Patent [19]

Suzuki et al.

[11] Patent Number: 4,941,437
[45] Date of Patent: Jul. 17, 1990

[54] AUTOMOTIVE RADIATOR COOLING SYSTEM

[75] Inventors: Yasushi Suzuki, Chiryu; Yasuo Takahara, Anjo; Atusi Masui, Kariya; Toshihiro Ohshima; Fumihiro Takeuchi, both of Nagoya; Toshiki Sugiyama, Obu; Tadashi Setoguchi, Kariya, all of Japan

[73] Assignees: Nippondenso Co., Ltd.; Toyota Jidosha Kabushiki Kaisha, both of Japan

[21] Appl. No.: 209,636

[22] Filed: Jun. 21, 1988

[30] Foreign Application Priority Data

Jul. 1, 1987 [JP] Japan .................................. 62-164166
Jul. 10, 1987 [JP] Japan .................................. 62-173468

[51] Int. Cl.$^5$ ............................................. F01P 7/02
[52] U.S. Cl. ................... 123/41.12; 123/41.49; 60/456; 60/468
[58] Field of Search ............... 123/41.11, 41.12, 41.49; 60/464, 466, 468, 456; 417/294

[56] References Cited

U.S. PATENT DOCUMENTS

| | | | |
|---|---|---|---|
| 3,549,209 | 12/1970 | Moericke | 60/466 X |
| 3,659,567 | 5/1972 | Murray | 123/41.12 |
| 3,664,129 | 5/1972 | Schwab | 60/468 |
| 3,744,244 | 7/1973 | Swoager | 60/464 X |
| 3,937,016 | 2/1976 | Stan et al. | 60/468 X |
| 4,066,047 | 1/1978 | Vidakovic et al. | 123/41.12 |
| 4,487,255 | 12/1984 | Bianchetta et al. | 123/41.12 X |
| 4,709,666 | 12/1987 | Merz | 123/41.12 |
| 4,738,330 | 4/1988 | Suzuki et al. | 123/41.12 X |

FOREIGN PATENT DOCUMENTS 1170194 5/1964 Fed. Rep. of Germany ... 123/41.12
58-142314 9/1983 Japan .

Primary Examiner—Noah P. Kamen
Attorney, Agent, or Firm—Kenyon & Kenyon

[57] ABSTRACT

An automotive radiator cooling system has a radiator cooling fan driven by a hydraulic motor actuated by a pressurized fluid fed through a hydraulic circuit from an engine-driven hydraulic pump. A bypass line extends in bypassing relationship to the hydraulic motor and has ends connected to the circuit upstream and downstream of the hydraulic motor, respectively. A check valve is provided in the bypass line and is operative to allow a flow of the fluid from a reservoir through the bypass line back into a part of the circuit upstream of the motor only when a pressure drop takes place in that part of the circuit due to free rotation of the cooling fan, and thus of the motor, independently of the drive by the hydraulic pump. The backward flow of the fluid is operative to compensate for the pressure drop to prevent the occurrence of cavitation in the circuit upstream of the motor. Desirably, the bypass line is incorporated into the housing of the hydraulic motor.

3 Claims, 3 Drawing Sheets

AUTOMOTIVE RADIATOR COOLING SYSTEM

BACKGROUND OF THE INVENTION

1. Field of the Invention

The present invention relates to an improvement in an automotive cooling system and, more particularly, to a hydraulic system for driving a cooling fan for a heat exchanger on an automobile.

2. Description of the Prior Art

A cooling system for vehicles has heretofore been known which includes a hydraulic motor for driving a cooling fan. For example, Japanese Unexamined Utility Model Publication No. 58-142,314 discloses a hydraulic system which includes an engine-driven hydraulic pump operative to circulate a hydraulic fluid through a hydraulic driving circuit, a hydraulic motor disposed in the circuit and a valve disposed in series or parallel relationship to the hydraulic motor and responsive to signals such as an air-conditioner signal and a water temperature signal to control the rate of the fluid supply to the hydraulic motor.

In the hydraulic system disclosed in the Japanese publication referred to above, however, if the automotive engine is stopped with the cooling fan and the hydraulic motor both rotated at high speeds, the rate of the hydraulic fluid supply to the hydraulic motor is suddenly decreased to zero. The rotations of the cooling fan and the hydraulic motor are continued due to inertia. Although the speeds of the rotations are gradually lowered, the rotating hydraulic motor now functions as a pump which sucks the fluid and then discharges the same. However, because the fluid supply to the hydraulic motor is now interrupted, a depression is created in the inlet side of the hydraulic motor, so that a cavitation is caused in the hydraulic motor and in the part of the hydraulic circuit connected to the motor to raise problems of the occurrence of noise and damage to the hydraulic motor.

In addition, when an automobile which is equipped with the cooling system is driven at a high speed and the ram causes the cooling fan to rotate freely at a speed higher than a predetermined value, a cavitation is also caused in the cooling system to not only produce noises but also generate a resistance to the free rotation of the cooling fan. The resistance reduces the usefulness of the ram.

SUMMARY OF THE INVENTION

It is an object of the present invention to provide an automotive radiator cooling system which is improved to prevent the occurrence of cavitation otherwise caused by free rotation of the cooling fan and thus of the hydraulic motor thereby to eliminate the occurrence of noise in the system as well as to guard the hydraulic motor against damage otherwise caused by such cavitation.

To achieve the object, the automotive radiator cooling system according to the present invention is provided with a bypass line disposed in bypassing relationship to a hydraulic motor and having an end communicated with a hydraulic circuit adjacent to the inlet of the motor and having the other end communicated with a reservoir. The bypass line is provided therein with a check valve which is operative when the pressure in the part of the circuit adjacent to the motor inlet is lowered beyond a predetermined pressure level to permit the hydraulic fluid to flow from the part of the circuit adjacent to the reservoir to the part of the circuit adjacent to the pump inlet.

The provision of the bypass line with the check valve disposed therein is advantageous in that, when a pressure drop takes place in the part of the hydraulic circuit adjacent to the hydraulic motor inlet due to a free rotation of the cooling fan and thus of the motor, the check valve is opened to allow the hydraulic fluid to flow from the reservoir through the bypass line to the part of the circuit adjacent to the motor inlet to compensate for the pressure drop in the circuit adjacent to the motor inlet. Accordingly, the occurrence of cavitation in the part of the circuit adjacent to the motor inlet is prevented to advantageously eliminate the occurrence of noise in the system and prevent the motor from being damaged.

The above and other objects, features and advantages of the present invention will be made more apparent by the following description of preferred embodiments with reference to the accompanying drawings.

DESCRIPTION OF PREFERRED EMBODIMENTS

Figure 1:
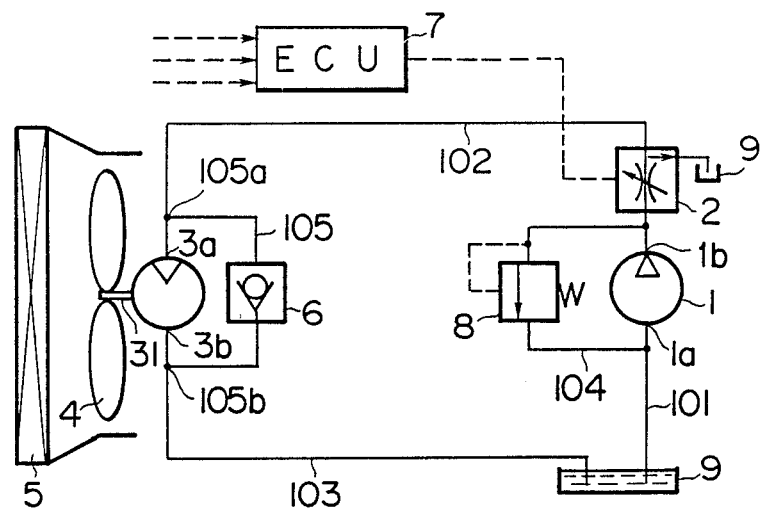
FIG. 1 is a diagrammatic illustration of an embodiment of the automotive radiator cooling system according to the present invention.

A hydraulic pump 1 is of any one of vane type, gear type and piston type and driven by an external power such as an automotive engine (not shown) to suck a hydraulic fluid from a reservoir 9 through a suction line 101 connected to a suction port 1a in the pump 1. The fluid thus sucked into the pump 1 is discharged therefrom through a discharge port 1b into a fluid supply line 102 at a predetermined pressure level.

The suction line 101 and the fluid supply line 102 are interconnected by a relief line 104 extending in bypassing relationship to the hydraulic pump 1. The relief line 104 is provided therein with a relief valve 8 which is operative to open to allow the fluid to flow from the supply line 102 to the suction line 101 when the discharge pressure of the pump 1 exceeds a predetermined level.

The supply line 102, which is connected at its one end to the discharge port 1b of the pump 1, is connected at the other end to an inlet 3a of a hydraulic motor 3. A flow rate controlling valve 2 is disposed in the fluid supply line 102 to control the rate of fluid supply from the pump 1 through the supply line 102 to the hydraulic motor 3. The valve 2 is of the type that is operative to vary the fluid-passage cross-sectional area of the supply line 102 in response to an electronic duty signal from an electronic control unit (which is termed "ECU" hereinunder) 7. The ECU 7 receives signals from a water temperature sensor (not shown) for detecting an engine cooling water temperature, from an air-conditioner switch for detecting an operation of an automotive air-conditioner and from an air-conditioner high pressure signal for detecting a high refrigerant pressure in the air-conditioner. On the basis of these signals, the ECU 7 determines the radiation load on an automotive radiator 5 to feed duty signals to the flow rate controlling valve 2.

The hydraulic motor 3 is driven by the flow of the hydraulic fluid supplied from the supply line 102 through the inlet 3a into the motor and has an output shaft 31 connected with a cooling fan 4 for the radiator 5. The motor 3 has an outlet 3b to which is connected an end of a return line 103 the other end of which is connected to a reservoir 9. Thus, the hydraulic fluid, which has entered the hydraulic motor 3 and driven the same, is returned through the outlet 3b of the motor and through the return line 103 back into the reservoir 9. It will therefore be understood that the lines 101, 102 and 103 and the reservoir 9 constitute a hydraulic circuit with the pump 1, the flow rate controlling valve 2 and the motor 3 disposed therein.

The hydraulic circuit is provided with a bypass line 105 which extends in bypassing relationship to the motor 3 and having ends 105a and 105b respectively connected to the fluid supply line 102 adjacent to the motor inlet 3a and to the return line 103 adjacent to the motor outlet 3b. Because the return line 103 leads to the reservoir 9, the bypass line 105 is operative to communicate the reservoir 9 with the part of the hydraulic circuit adjacent to the inlet 3a of the hydraulic motor 3.

The bypass line 105 is provided therein with a check valve 6 operative to allow only a flow of the fluid from the return line 103 to the supply line 102. Normally, this check valve 6 blocks the bypass line 105. However, when the pressure in the part of the circuit adjacent to the motor inlet 3a is lowered beyond a predetermined level, the check valve 6 is opened to allow the hydraulic fluid to flow from the return line 103 of the circuit through the bypass line 105 into the supply line 102.

The cooling fan 4 is disposed in opposed relationship to a heat radiation surface of the radiator 5 for cooling engine cooling water and is driven by the hydraulic motor 3 to direct cooling air to the radiator 5.

The hydraulic motor 3 will now be described in detail with reference to FIGS. 3 and 4. The motor 3 has a housing 201 comprising a casing 202 and an end cover 203. The casing 202 and the end cover 203 are both made of an aluminum alloy. The casing 202 is generally cup-shaped and has an open end to which the cover 203 is secured by bolts 205 to close the opening in the casing. Thus, a generally cylindrical space is defined in the housing 201. The cylindrical space accommodates an internal gear 210 rotatably mounted in the housing 201. The internal gear 210 has a cylindrical outer peripheral surface 211 disposed in rotatably sliding contact with the inner peripheral surface 212 of the cylindrical space in the housing 201. The internal gear 210 further has opposite end faces 213 and 214 respectively disposed in rotatable sliding contact with end faces of the cylindrical space in the housing 201. The inner peripheral surface of the internal gear 210 is shaped to provide a plurality of circumferentially equally spaced arcuate teeth 217.

The shaft 218 is rotatably mounted in the housing 201 and has a splined part 219 which extends through the space in the housing 201. The splined shaft part 219 is axially fixed relative to the housing 201 by washers 208 and 209. The splines on the shaft part 219 are in meshing engagement with internal gear teeth 225 of an output gear 220 so that the output gear 220 is rotatable together with the shaft 218 and is also axially movable relative to the shaft 218. One end of the shaft 218 extends outwardly from the housing 201 and is fixed to the cooling fan 4. Because the output gear 220 is axially movable relative to the shaft 218, any thrust force which would be imparted by the cooling fan 4 to the shaft 218 is not transmitted from the shaft to the output gear 220, whereby the latter can be prevented from being damaged by such thrust force.

An oil seal 222 is disposed in an annular space defined between the housing 201 and the shaft 218 to prevent leakage of pressurized fluid through the annular space.

The output gear 220 is disposed in the inner space defined in the internal gear 210 and has opposite end faces 223 and 224 disposed in rotatable sliding contact with the end faces 215 and 216 of the cylindrical space in the housing 201.

The output peripheral surface of the output gear 220 is formed thereon with a plurality of circumferentially equally spaced trochoidal teeth 221 of a number which is smaller by one than the number of the internal gear teeth 217 of the internal gear 210. The external gear teeth 221 of the output gear 220 are engaged with the internal gear teeth 217 of the internal gear 210 to cooperate therewith to define working chambers 230.

A generally arcuate fluid introduction groove 231 is formed in an inner surface of the casing 202 and communicated with the inlet 3a of the hydraulic motor 3 to feed pressurized hydraulic fluid into working chambers 230.

A second generally arcuate fluid discharge groove 232 is also formed in the inner surface of the casing 202 and communicated with the outlet 3b of the hydraulic motor 3 to allow the pressurized hydraulic fluid to be discharged from the working chambers 230 through the return line 103 back into the reservoir 9.

Figure 3:
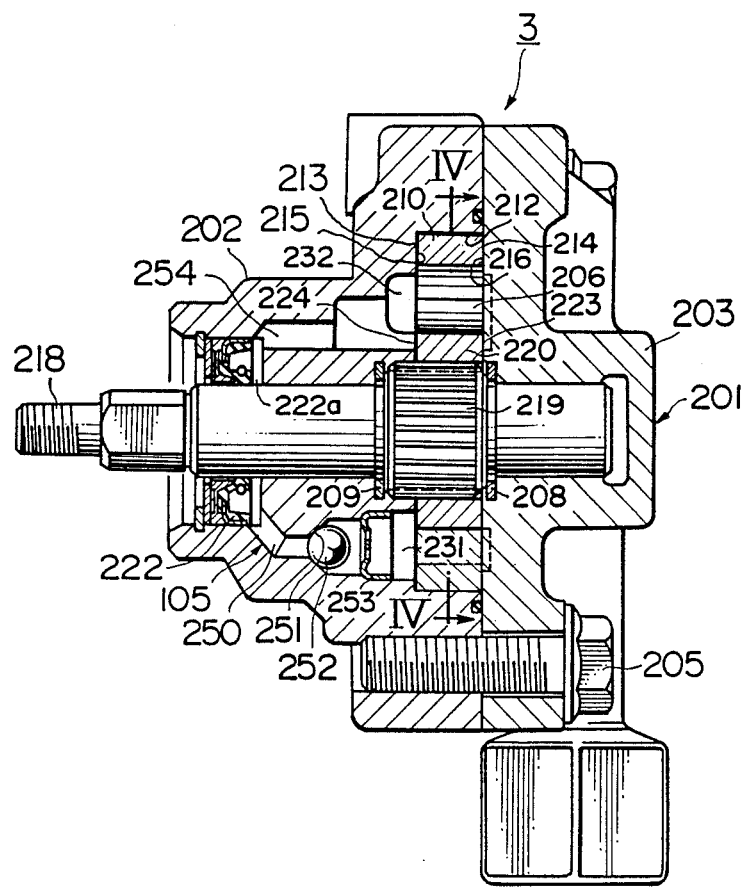
FIG. 3 is an axial sectional view of a hydraulic motor incorporated in each of the embodiments shown in FIGS. 1 and 2.
Figure 4:
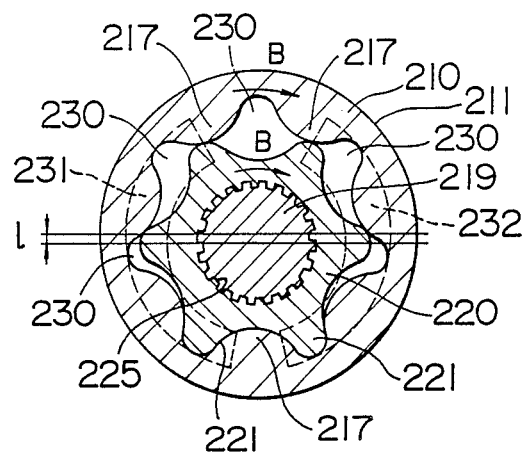
FIG. 4 is a cross-sectional view of the hydraulic motor taken along line IV—IV in FIG. 3.
Figure 5:
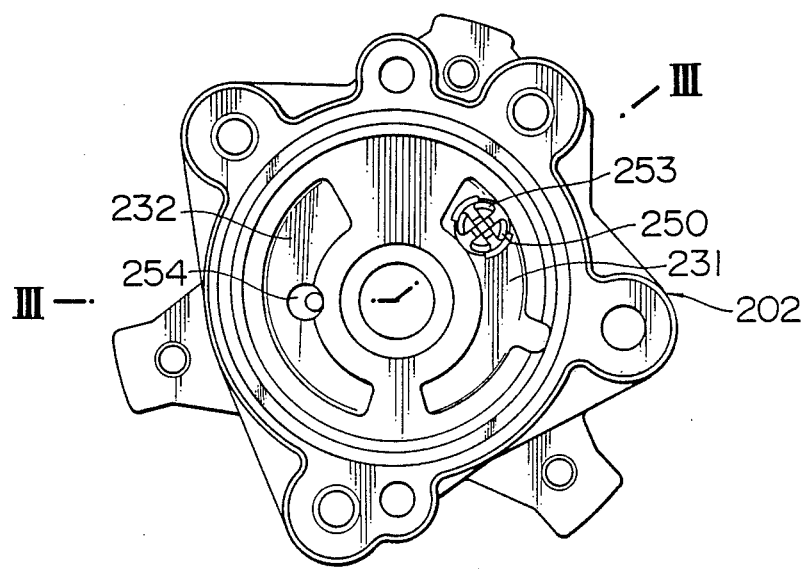
FIG. 5 is an end view of a casing of a motor housing.

As will be seen in FIG. 3, a first bypass port 250 is formed in the casing 202 and communicated at one end with the fluid introduction groove 231 and at the other end with an annular oil chamber 222a defined around the shaft 218 and inwardly of the oil seal 222. This bypass port 250 is formed by drilling a hole in the bottom of the fluid introduction groove 231 in the bottom wall of the casing 202, as will be seen in FIG. 5. The inner peripheral surface of the first bypass port 250 is shaped to provide an annular valve seat 251. A ball valve member 252 is disposed in the first bypass port 250 and associated with the valve seat 251. The valve seat 251 and the valve member 252 cooperate together to constitute the afore-mentioned check valve 6 which is operative to allow only a flow of the fluid from the annular oil chamber 222a into the fluid introduction groove 231. For this purpose, the ball valve member 252 is movable away from the valve seat 251. This movement, however, is limited by a stop 253 provided in the first bypass port 250 adjacent to the bottom of the fluid introduction groove 231. The stop 253 is formed by a generally cup-shaped member inserted into the first bypass port 250 and secured to the casing 202 by deforming an annular shoulder formed on the inner peripheral surface of the port 250. An opening is formed in the bottom of the stop 253 and shaped to allow the fluid flow from the annular oil chamber 222a to the fluid introduction groove 231 even when the ball valve member 252 is in abutment contact with the stop 253.

The casing 202 is further formed therein with a second bypass port 254 which is communicated at one end with the fluid discharge groove 232 and at the other end with the annular oil chamber 222a. This port 254 is also formed by drilling a hole in the bottom of the fluid discharge groove 232. The first and second bypass ports 250 and 254 are communicated with each other by the intermediary of the annular oil chamber 222a and constitute the afore-mentioned bypass line 105.

In operation, the hydraulic pump 1 is driven by an external power such as an automotive engine (not shown) and sucks the hydraulic fluid from the reservoir 9 and discharges the fluid through the flow rate controlling valve 2 into the fluid supply line 102. The fluid then flows through the inlet 3a of the hydraulic motor 3 and then through the fluid introduction groove 231 into the working chambers 230. The hydraulic fluid which has been in the working chambers 230 is forced into the first bypass port 250, so that the ball valve member 252 is moved into sealing engagement with the annular valve seat 251 to block the bypass line 105. Then, the difference in the pressure-receiving area between the high pressure fluid and the low pressure fluid both acting on the output gear 220 causes the output gear 220 and the internal gear 210 to rotate respectively at predetermined speeds in a direction indicated by an arrow B shown in FIG. 4 while they are in meshing engagement with each other and are offset a distance l shown in FIG. 4. The fluid is then discharged from the working chambers 230 through the fluid discharge groove 232 into the return line 103. In consequence, the shaft 218 is rotated with the output gear 220 and drives the cooling fan 4. The fan 4, therefore, directs cooling air to the radiator 5 to cool the same.

The flow rate controlling valve 2 is responsive to signals from the ECU 7 to control the rate of the fluid flow through the supply line 102 such that the flow rate is increased as the engine cooling water temperature is increased. The flow rate is also increased when the pressure of the refrigerant in the high pressure side of a refrigeration cycle of an associated air-conditioner is increased.

On the other hand, in the case where the hydraulic pump 1 is suddenly stopped due to a turning off of an engine switch (not shown) but the hydraulic motor 3 is still running due to inertia, or in the case where the ram formed during an operation of an associated automobile drives the cooling fan 4 so that the hydraulic motor 3 is rotated at a speed higher than the speed at which the motor 3 is driven by the hydraulic pump 1, a pressure drop takes place in the circuit adjacent to the inlet 3a of the hydraulic motor 3, so that negative pressure is caused in the fluid introduction groove 231 and the working chambers 230 in the hydraulic motor 3.

However, because the fluid discharge groove 232 is in communication with the reservoir 9 (at substantially atmospheric pressure) at this time, the fluid on the low pressure side of the hydraulic circuit flows from the return line 103 through the fluid discharge groove 232, through the working chambers 230 on the low pressure side, through the second bypass port 254, and through the annular oil chamber 222a into the first bypass port 250 to move the ball valve member 252 away from the valve seat 251. Thus, the hydraulic fluid in the low pressure side of the first bypass port 250 is fed into the working chambers 230, the fluid introduction groove 231 and the inlet 3a in the hydraulic motor 3 to compensate for the pressure drop in these portions of the motor 3, whereby the occurrence of cavitation in the part of the circuit adjacent to the motor inlet 3a can be eliminated to advantageously prevent the occurrence of noise and damage to the hydraulic motor.

In the described embodiment of the invention, the first bypass port 250 is formed by drilling a hole in the bottom of the interior of the cup-shaped casing 202 of the motor housing 201. The ball valve member 252 is then placed in the first bypass port 250. Thereafter, the internal gear 210 and the output gear 220 are placed in the internal space in the casing 202, which is followed by the attachment of the end cover 203 to the open end of the casing 202. It will, therefore, be appreciated that the working steps for installing the ball valve member 252 in the first bypass port 250 are simplified and that any extra element, such as a blind plug required to close a bypass port drilled in a casing from outside thereof to mount a ball valve member therein, is not required.

The described embodiment of the invention is also advantageous in that, because the check valve 6 constituted by the ball valve member 252 and the valve seat 251 is disposed in the housing 201 of the hydraulic motor, the check vale 6 can be disposed close to the gears 210 and 220 and, accordingly, the bypass line 105 can be shortened than in the case where the check valve 6 is disposed outside the motor housing 201. In consequence, the response of the hydraulic motor is improved.

Figure 2:
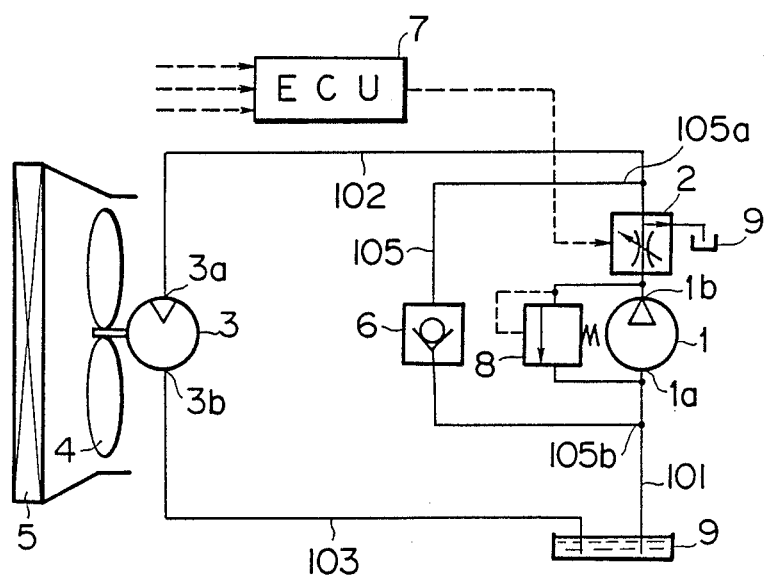
FIG. 2 is similar to FIG. 1 but illustrates another embodiment of the present invention.

A second embodiment of the invention is shown in FIG. 2 in which the parts or members the same as or equivalent to those in the first embodiment are designated by the same reference numerals. In the second embodiment, the other end of the bypass line 105 is connected to the section line 101 of the circuit so that the other end of the bypass line 105 is communicated with the reservoir 9 through the suction line 101 of the circuit. The one end of the bypass line 105 is connected to the fluid supply line 102 between the flow rate controlling valve 2 and the inlet 3a of the hydraulic motor 3. Thus, as in the first embodiment of the invention, the bypass line 105 extends in bypassing relationship to the hydraulic pump 1 and communicates the part of the circuit adjacent to the motor inlet 3a with the reservoir 9.

The second embodiment of the invention is the same as the first embodiment in all of the other points.

As having been described above, the automotive radiator cooling system according to the present invention is constructed to prevent the occurrence of cavitation in the circuit adjacent to the inlet of the hydraulic motor in the hydraulic circuit because, even when a pressure drop takes place in the circuit adjacent to the motor inlet, the check valve in the bypass line is opened to allow a flow of fluid from the return line of the circuit through the bypass line back into the part of the circuit adjacent to the motor inlet. The prevention of the cavitation is effective to prevent the occurrence of noise and damage to the hydraulic motor.

In the system of the invention, moreover, the check valve is disposed in the bypass line which is formed in the housing of the hydraulic motor. Accordingly, the system does not require any bypass pipe line for the check valve. Compared with the case where the check valve is disposed outside the housing of the hydraulic motor, therefore, the system according to the present invention can advantageously be of a greatly reduced weight and, accordingly, contribute to reduction in the weight of an associated vehicle.

What is claimed is:

1. An automotive radiator cooling system comprising:
   a cooling fan operative to direct cooling air to an automotive radiator;
   a hydraulic circuit;
   a hydraulic pump disposed in said circuit and driven by an external power to circulate a pressurized hydraulic fluid through said circuit;
   a hydraulic motor drivingly connected to said cooling fan and disposed in said circuit so that said motor is hydraulically driven to rotate said cooling fan;
   a reservoir connected to said circuit downstream of said hydraulic motor to receive the hydraulic fluid flowing out of said hydraulic motor;
   a bypass line extending in bypassing relationship to said hydraulic motor and communicated at one end with a part of said circuit adjacent to an inlet of said hydraulic motor and at the other end with said reservoir; and
   a check valve means operative to permit a flow of the hydraulic fluid from said reservoir through said bypass line back into said part of said circuit only when the pressure in said part of said circuit is lowered beyond a predetermined level, thereby preventing the occurrence of cavitation when the hydraulic pump is stopped while the fan is rotating at high speed;
   wherein said hydraulic motor includes a housing, a shaft having an end drivingly connected to said cooling fan and rotatably mounted in said housing, and a shaft sealing means associated with said shaft to cooperate therewith and with said housing to define an oil chamber; and
   wherein said bypass line is formed in said housing of the hydraulic motor and includes said oil chamber.

2. An automotive radiator cooling system according to claim 1, wherein said hydraulic circuit includes a return line extending between an outlet of said hydraulic motor and said reservoir and wherein said other end of said bypass line is connected to said return line.

3. An automotive radiator cooling system comprising:
   a cooling fan operative to direct cooling air to an automotive radiator;
   a hydraulic circuit;
   a hydraulic pump disposed in said circuit and driven by an external power to circulate a pressurized hydraulic fluid through said circuit;
   a hydraulic motor drivingly connected to said cooling fan and disposed in said circuit so that said motor is hydraulically driven to rotate said cooling fan;
   a reservoir connected to said circuit downstream of said hydraulic motor to receive the hydraulic fluid flowing out of said hydraulic motor;
   a bypass line extending in bypassing relationship to said hydraulic motor and communicated at one end with a part of said circuit adjacent to an inlet of said hydraulic motor and at the other end with said reservoir; and
   a check valve means operative to permit a flow of the hydraulic fluid from said reservoir through said bypass line back into said part of said circuit only when the pressure in said part of said circuit is lowered beyond a predetermined level, thereby preventing the occurrence of cavitation when the hydraulic pump is stopped while the fan is rotating at high speed, wherein said hydraulic motor comprises:
   a housing defining therein a generally cylindrical space;
   an internal gear having a substantially cylindrical outer peripheral surface disposed in rotatably sliding contact with an inner peripheral surface of said cylindrical space, said internal gear further having an inner peripheral surface formed thereon with a plurality of circumferentially equally spaced gear teeth;
   a shaft rotatably mounted in said housing and having an end extending outwardly from said housing and drivingly connected to said cooling fan;
   an output gear connected to said shaft for rotation therewith and disposed radially inwardly of said inner peripheral surface of said internal gear, said output gear being disposed in rotatably sliding contact with opposed end faces of said cylindrical space in said housing and having an outer peripheral surface formed thereon with a plurality of circumferentially equally spaced gear teeth disposed in meshing engagement with the gear teeth of said internal gear to cooperate therewith to define working chambers;
   said housing being formed therein with a fluid inlet through which the hydraulic fluid fed from said hydraulic pump through said hydraulic circuit is introduced into said working chambers so that said output gear and said shaft are rotated, said housing being also formed therein with a fluid outlet through which the hydraulic fluid is discharged into said circuit downstream of said hydraulic motor;
   said bypass line being formed in said housing and interconnecting said fluid inlet and outlet; and
   said check valve being operative to allow only the flow of the fluid from said fluid outlet to said fluid inlet.

* * * * *